US011323425B2

(12) United States Patent
Greenwood et al.

(10) Patent No.: US 11,323,425 B2
(45) Date of Patent: May 3, 2022

(54) SYSTEMS AND METHODS FOR SELECTING CRYPTOGRAPHIC SETTINGS BASED ON COMPUTING DEVICE LOCATION

(71) Applicant: Lenovo Enterprise Solutions (Singapore) Pte. Ltd., New Tech Park (SG)

(72) Inventors: Taylor Leigh Greenwood, Research Triangle Park, NC (US); Doug Oliver, Research Triangle Park, NC (US); Christopher A. Peterson, Research Triangle Park, NC (US); Scott Piper, Research Triangle Park, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 161 days.

(21) Appl. No.: 16/574,293

(22) Filed: Sep. 18, 2019

(65) Prior Publication Data

US 2021/0084017 A1  Mar. 18, 2021

(51) Int. Cl.
*H04L 9/32* (2006.01)
*H04L 29/06* (2006.01)
*G06F 9/455* (2018.01)

(52) U.S. Cl.
CPC ...... *H04L 63/0485* (2013.01); *G06F 9/45558* (2013.01); *H04L 9/3234* (2013.01); *G06F 2009/45587* (2013.01)

(58) Field of Classification Search
CPC ... H04L 9/0872; H04L 9/0877; H04L 63/107; H04L 63/0485; H04L 9/3234; G06F 2009/45587
See application file for complete search history.

(56) References Cited

U.S. PATENT DOCUMENTS

| | | | | |
|---|---|---|---|---|
| 2012/0275598 | A1* | 11/2012 | Vimpari | H04L 9/088 380/255 |
| 2014/0304797 | A1* | 10/2014 | Fu | G06F 21/335 726/10 |
| 2015/0256341 | A1* | 9/2015 | Ye | H04L 9/3234 713/164 |
| 2016/0134623 | A1* | 5/2016 | Roth | H04L 9/3268 713/156 |
| 2017/0093807 | A1* | 3/2017 | Gross | H04B 3/52 |
| 2020/0159555 | A1* | 5/2020 | Liguori | G06F 9/5077 |

* cited by examiner

*Primary Examiner* — Matthew T Henning
(74) *Attorney, Agent, or Firm* — Olive Law Group, PLLC

(57) ABSTRACT

Systems and methods for selecting cryptographic settings based on computing device location are disclosed. According to an aspect, a method includes determining a location of a client of a server. The method also includes selecting, at the server and based on the location of the client, one of several different cryptographic settings for communication with the client or data management. The method may also include implementing, at the server, the selected cryptographic setting.

20 Claims, 3 Drawing Sheets

SYSTEMS AND METHODS FOR SELECTING CRYPTOGRAPHIC SETTINGS BASED ON COMPUTING DEVICE LOCATION

TECHNICAL FIELD

The presently disclosed subject matter relates to computing device encryption. More particularly, the presently disclosed subject matter relates to systems and methods for selecting cryptographic settings based on computing device location.

BACKGROUND

For electronic communications among computing devices, cryptographic functions are commonly used to prevent third parties from intercepting and understanding the content of communicated messages or data. For example, computing devices, such as servers, may include specialized hardware and software for implementing cryptographic operations such as key management, key exchange, and encryption. These safeguards have become increasingly important, particularly when communicating financial and other confidential information.

A trusted platform module (TPM) is one type of hardware component utilized for implementing cryptographic functions. The TPM may include multiple physical security mechanisms to make it tamper resistant, and functionality to prevent malicious software from tampering with its security functions. Common functions of the TPM include measuring system integrity and key creation and use. The integrity measurements can be used as evidence for how a system started and to make sure that a TPM-based key was used only when the correct software was used to boot the system. Different versions of the TPM are defined in specification provided by the Trusted Computing Group (TCG).

Another type of hardware component used for cryptographic functions is a trusted cryptography module (TCM). This standard was developed in China as an alternative to TPM. Functions of TCM include, but are not limited to cryptography, device integrity management, data encryption, and access authorization services.

Different countries have different regulations about which cryptographic and other security features may be used within their country, particularly for cryptographic hardware. In North America and Europe, TPM chips are widely used and required. However, TPM chips are not allowed in China unless it is produced by an approved manufacturer. In addition, many countries and regions, including the United States, the European Union, Russia, and China, have requirements about which cryptographic algorithms and key strengths are allowed to be used, and those requirements can vary widely from country to country. Additionally, these regulations can change over time. It can be difficult for manufacturers of computing devices and security hardware components to track which features are permitted to ensure they comply with requirements.

In view of the foregoing, there is a continuing need for solutions to ensure that computing devices comply with cryptographic and other security features regulations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for selecting cryptographic settings based on computing device location. According to an aspect, a method includes determining a location of a client of a server. The method also includes selecting, at the server and based on the location of the client, one of several different cryptographic settings for communication with the client or data management. The method may also include implementing, at the server, the selected cryptographic setting.

According to another aspect, a method includes, at a computing device, determining the location of the computing device. The method also includes selecting one several different cryptographic settings for communication or data management. Further, the method may also include implementing the selected cryptographic setting.

BRIEF DESCRIPTION OF THE DRAWINGS

The foregoing summary, as well as the following detailed description of various embodiments, is better understood when read in conjunction with the appended drawings. For the purposes of illustration, there is shown in the drawings example embodiments; however, the presently disclosed subject matter is not limited to the specific methods and instrumentalities disclosed. In the drawings.

DETAILED DESCRIPTION

Figure 1:
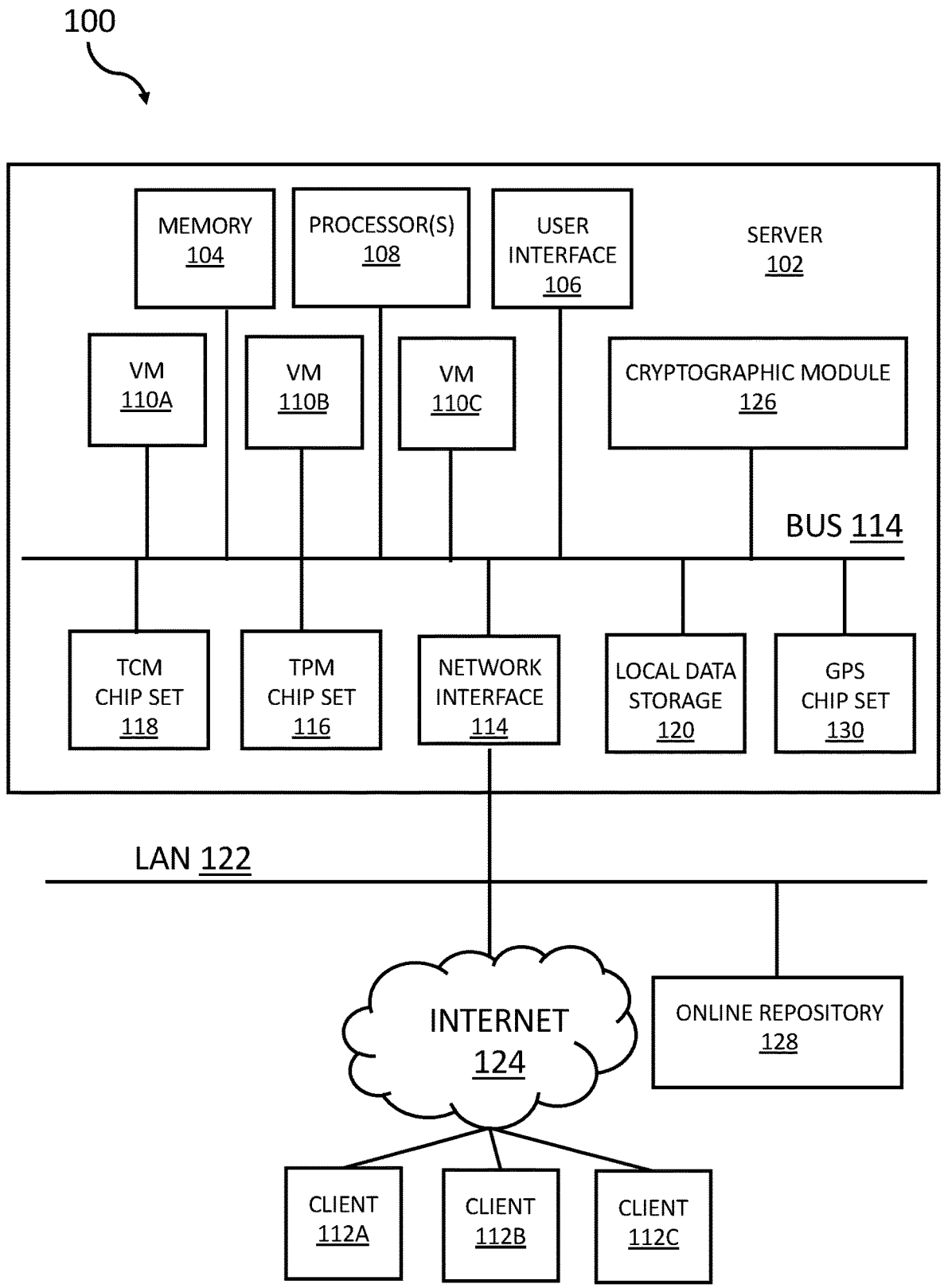
FIG. 1 is a block diagram of an example system for selecting cryptographic settings based on a location of a computing device in accordance with the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Systems and methods according to embodiments of the present disclosure can be used to ensure that computing devices comply with cryptographic and other security features regulations of various countries and other geographic regions. In accordance with embodiments, a server or other computing device may have multiple cryptographic personalities or settings available for use or implementation. This may be in the form of different types of cryptographic hardware (e.g., a TCM, which meets Chinese requirements, and a TPM which meets requirements in other places), software libraries or algorithms, or combinations thereof. The server may determine the source location of a given user connecting to the server and subsequently select a cryptographic setting to be used for that user that complies with the regulations of that user's location. In this way, the server can encrypt data, hash data, or implement other security features based on the regulations of the location of the user. This may apply to cryptographic technology selected for the connection between the user and the network service in addition to the storage of the data.

In accordance with embodiments, a system may implement multiple virtual machines, each of which was assigned a different cryptographic setting depending on a location of a client using that respective virtual machine. An incoming connection handler can connect each client to the appropriate virtual machine based upon a rule repository and the client's detected location.

As referred to herein, a "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be any type of conventional computer, such as a laptop computer or a tablet computer or a desktop computer. In another example, the computing device may be a type of network device such as a router or a switch. In another example, the computing device may be a smart television or a high definition television. In another example, the computing device may be a battery powered Internet of Things (IoT) device. Although many of the examples provided herein are implemented on servers in a data center, the examples may similarly be implemented on any suitable computing device or computing devices.

As referred to herein, a "server" may be any suitable computing device that provides functionality for other computing devices or programs, referred to as "clients". A single server may serve multiple clients, and a single client can use multiple servers. Multiple servers may operate in a data center, which is a facility that houses the servers and associated electronic components, such as telecommunication and storage systems.

FIG. 1 illustrates a block diagram of an example system 100 for selecting cryptographic settings based on a location of a computing device in accordance embodiments of the present disclosure. In this example, the computing device is a server 102 operating within a data center; however, it should be understood that in the alternative it may be any other suitable type of computing device. For example, the computing device may also be any suitable computer such as a laptop computer, a tablet computer, or a desktop computer. In another example, the computing device may be a type of network device such as a router or a switch.

The server 102 may include memory 104 (e.g., RAM) on which communication data, confidential information, or other sensitive information may be stored. Memory 104 may store an operating system for managing hardware, software, and other resources of the server 102. The operating system may also provide various services for computer programs residing on the server 102. A user interface 106 may be operatively connected to the server 102 and can include an input for allowing users to manipulate the server 102, and can include an output for allowing the server 102 to present information and/or data, indicate the effects of the user's manipulation, etc. An example of a user interface on the server 102 includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, the user interface 106 can be a display window or display object, which is selectable by a user of a computing device for interaction. In another example, the user can use any other suitable user interface of a computing device, such as a keypad, to select the display icon or display object.

The server 102 may include one or more processors 108 configured to manage and implement functionality as requested by clients, such as providing virtual machines 110A-110C for use by the client computing devices 112A-112C, respectively. Although server 102 is described as providing virtual machine functionality in this example, it should be understood that the server 102 may be provide any other suitable services to clients, such as email services, website services, data storage, and the like.

The processor(s) 108 may be part of a central processing unit (CPU) that is operable with a bus 114 for communication with and control of other modules and components of the server 102. For example, the CPU may communicate with a network interface 114, a TPM chip set 116, a TCM chip set 118, and local data storage 120. The local data storage 120 may store hardware cryptographic rules and regulations associated with geographic region in which the server 102 is located. The local data storage 120 may also store cryptographic settings in accordance with the rules and regulations of different geographic regions. Further, the server 102 may recognize its location and apply the stored cryptographic settings associated with its location in accordance with embodiments of the present disclosure. The server 102 may use the network interface 114 to communicate with client computing devices 112A-112C via a local area network (LAN) 122 and the Internet 124. The server 102 may also include a global positioning system (GPS) chip set 126 which is configured to determine and provide location information of the server 102. The location information may include latitude and longitude information of the server 102.

The server 102 may include a cryptographic module 126 for determining a location of a client of the server 102 one of the different cryptographic settings for either communication with the client and data management in accordance with embodiments of the present disclosure. Further, the server 102 may implement the selected cryptographic settings for the client. The cryptographic module 126 may include hardware, software, firmware, or combinations thereof for executing data encryption, data decryption, storage retrieval, storage requests, public key encryption, cypher sweeps, and digital certificate generation, data hashing, or the like.

In order to determine the location of the server 102, the cryptographic module 126 may communicate with the GPS chip set 130 to receive location information of the server 102. Alternatively, for example, the cryptographic module 126 may use the network interface 114 for acquiring the IP address or other information that can be used to determine location of the server 102. In another example, the cryptographic module 126 may use the network interface 114 to query a wireless network (e.g., WI-FI™ wireless communications network) to acquire location information. In accordance with embodiments, the cryptographic module 126 may implement a TCM standard or a TPM standard by selectively using either the TCM chip set 116 or the TPM chip set 118, respectively, based on a determined location of a client computing device and/or the server 102. For example, in response to determining that the device (i.e., server or client computing device) is within a particular country (e.g. China) that uses TCM chip set cryptographic requirements, the cryptographic module 126 may use the TCM chip set 118. Conversely, in response to determining that the device (i.e., server or client computing device) is within the United States or Europe that uses TPM chip set cryptographic requirements, the cryptographic module 126 may use the TPM chip set 1116. The cryptographic module 126 may detect the source location of a given client device, remote computing device, or user device connecting to the server 102 and select the cryptographic hardware infrastructure which complies with the regulations of the device's location.

In embodiments of the present disclosure, the software and hardware features of the cryptographic module 126 can improve upon the server's 102 performance and efficiency. For example, the server can execute different cryptographic operations for itself and/or its clients based on their respective geographic location. In particular, the server select to employ one of a TPM chip set, a TCM chip set, or another cryptographic chip set prior to executing a routine or task for the server or one of its clients. Excess cryptographic processing steps which are typically required when executing data encryption, cypher sweeps, or data hashing are eliminated, which in turn results in less storage being utilized by memory 104. In embodiments, the cryptographic module 126 may enable and/or disable cryptographic hardware functionalities based on the determination of which cryptographic chip set or other setting is selected to be executed.

In order to further advance and improve upon processing efficiency, the cryptographic module 126 may communicate with the network interface 114 in order to access an online rule repository 128, for example, via the LAN 122 in order to access additional or primary rules and regulations which govern the appropriate cryptographic hardware configuration (e.g., cryptographic ship set or settings) to execute based on the location obtain from the GPS chip set 130. The online rule repository 128 may be any type of database configured to store and retrieve information. Updated cryptographic hardware rules and regulations based on the country, territory of centralized location may be uploaded to the online rule repository 128 as regulations change.

Figure 2:
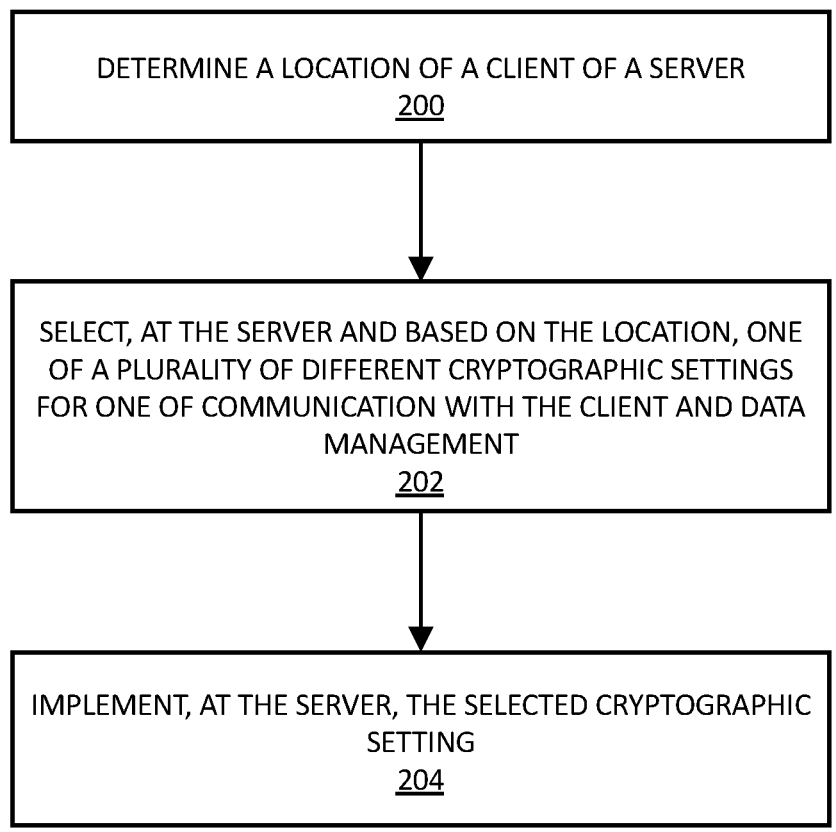
FIG. 2 is a flow chart of an example method for selecting cryptographic settings based on computing device location in accordance with embodiments of the present disclosure.

FIG. 2 illustrates a flow chart of an example method for selecting cryptographic settings based on computing device location in accordance with embodiments of the present disclosure. The example method is described as being implemented by the system 100 shown in FIG. 1, although it should be understood that the method may be similarly implemented by any other suitable system having any other suitable computing devices.

Referring to FIG. 2, the method includes determining 200 a location of a client of a server. For example, the cryptographic module 126 of the server 102 shown in FIG. 1 may determine a location of client computing device 112A. In this example, the client computing device 112A may communicate its location to the server 102 or the location information may otherwise be provided to the cryptographic module 126.

The method of FIG. 2 includes selecting 202, at the server and based on the location, one of a plurality of different cryptographic settings for one of communication with the client and data management. Continuing the aforementioned example, the cryptographic module 126 may select a cryptographic setting that complies with the determined location. For example, in response to determining that the client computing device 112A is located in China, the cryptographic module 126 may select a TCM standard. In another example, in response to determining that the client computing device 112A is located in the United States, the cryptographic module 126 may select a TPM standard.

The method of FIG. 2 includes implementing 204, at the server, the selected cryptographic setting. Continuing the aforementioned example, the cryptographic module 126 may use the TCM chip set 118 for implementing functions for the client computing device 112A in response to selecting the TCM standard. In another example, the cryptographic module 126 may use the TPM chip set 116 for implementing functions for the client computing device 112A in response to selecting the TPM standard. In this way, the cryptographic module 126 can select a cryptographic setting for operations of each client based on a location of the client.

Figure 3:
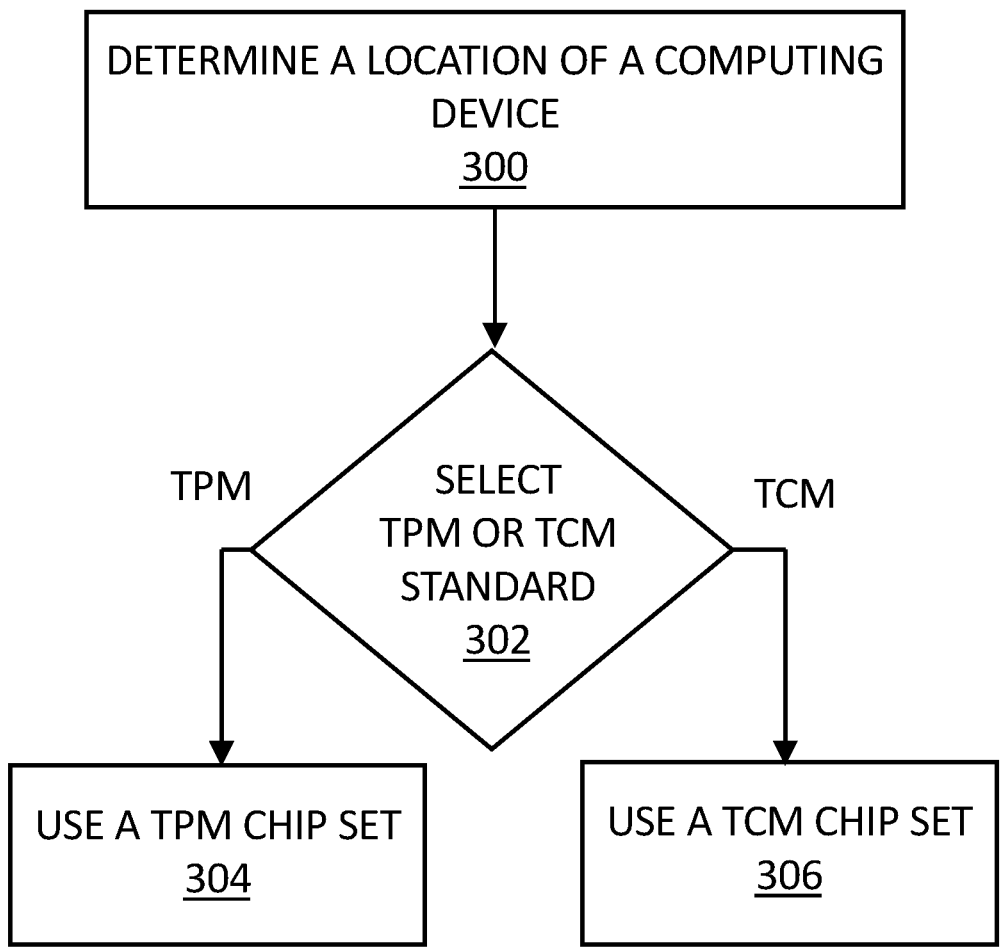
FIG. 3 is a flow chart of another example method for selecting cryptographic settings based on computing device location in accordance with embodiments of the present disclosure.

FIG. 3 illustrates a flow chart of another example method for selecting cryptographic settings based on computing device location in accordance with embodiments of the present disclosure. The example method is described as being implemented by the system 100 shown in FIG. 1, although it should be understood that the method may be similarly implemented by any other suitable system having any other suitable computing devices.

Referring to FIG. 3, the method includes determining 300 a location of a computing device. For example, the cryptographic module 126 of the server 102 shown in FIG. 1 may determine its location. In an example, at boot up of the server 102, the cryptographic module 126 may query the GPS chip set 130 for location information. The GPS chip set 130 may determine its location and send the location information to the cryptographic module 126. The cryptographic module 126 may access a database that indicates a country or other geographic area that the determined location is within.

The method of FIG. 3 includes selecting 302 a TPM standard or TCM standard based on the determined location. Continuing the aforementioned example, the cryptographic module 126 may select either the TPM standard or TCM standard based on the country or other geographic areas that the server 102 is determined to be located within. For example, in response to determining that the server 102 is located in China, the cryptographic module 126 may select a TCM standard. In another example, in response to determining that the server 102 is located in the United States, the cryptographic module 126 may select a TPM standard.

Subsequently, the method of FIG. 3 including using 304 a TPM chip set or using 306 a TCM chip set based on the selection 302. For example, the cryptographic module 126 may use TCM chip set 118 for implementing functions for the server 102 in response to selecting the TCM standard. In another example, the cryptographic module 126 may use the TPM chip set 116 for implementing functions for the server 102 in response to selecting the TPM standard. In this way, the cryptographic module 126 can select a cryptographic setting for operations of each client based on a location of the server 102.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   at a server comprising first and second hardware components including a Trusted Platform Module (TPM) hardware component and a Trusted Cryptography Module (TCM) hardware component, respectively, configured to implement first and second cryptographic functions, respectively, wherein the first and second cryptographic functions operate according to different standards, and wherein the first and second cryptographic functions are associated with different locations:
   providing a plurality of virtual machines, each virtual machine being associated with the first hardware component or the second hardware component;
   determining a location of a client of the server;
   determining to connect the client to one of the virtual machines associated with the cryptographic function associated with the location; and
   connecting the client to the one of the virtual machines; and
   at the first hardware component or the second hardware component of the virtual machine connected to the client:
   implementing functionality for the cryptographic function of the virtual machine connected to the client.

2. The method of claim 1, wherein the client comprises a computing device located remote from the server.

3. The method of claim 1, wherein determining a location of a client includes:
   determining an Internet protocol (IP) address of the client; and
   using the IP address to determine the location.

4. The method of claim 1, wherein the location is associated with a government territory, and wherein connecting the client to the one of the virtual machines comprises connecting the client to the one of the virtual machines based on the government territory associated with the location.

5. The method of claim 4, wherein the geographic territory corresponds to one of a country and governed geographic area.

6. The method of claim 1, wherein implementing the functionality includes communicating, at the server, with the client in accordance with a cryptographic setting of the virtual machine connected to the client.

7. The method of claim 1, wherein implementing the functionality includes communicating, at the server, managing data of the client in accordance with a cryptographic setting of the virtual machine connected to the client.

8. The method of claim 1, wherein a cryptographic setting of the virtual machine connected to the client is in accordance with one of TPM standard and TCM standard.

9. The method of claim 1, wherein implementing the functionality comprises using, for the client, the virtual machine connected to the client for emulation.

10. The method of claim 1, wherein implementing the functionality comprises one of encrypting and hashing for the client based on a cryptographic setting of the virtual machine connected to the client.

11. The method of claim 1, further comprising selecting a cryptographic setting of the virtual machine connected to the client based on a location of the server.

12. A method comprising:
at a computing device:
associating first and second cryptographic functions with first and second hardware components, respectively, wherein the first and second hardware components include a Trusted Platform Module (TPM) hardware component and a Trusted Cryptography Module (TCM) hardware component, respectively, and wherein the first and second cryptographic functions operate according to different standards, and wherein the first and second cryptographic functions are associated with different locations;
determining a location of the computing device;
connecting, based on the location of the computing device and the cryptographic function associated with the location, the computing device to one of a plurality of virtual machines associated with the cryptographic function that matches the location;
implementing, via the virtual machine connected to the computing device, functionality for the computing device in accordance with cryptographic function of the virtual machine connected to the computing device.

13. The method of claim 12, wherein the computing device is a server.

14. The method of claim 12, wherein the location is associated with a government territory.

15. The method of claim 12, wherein a cryptographic setting of the virtual machine connected to the computing device is in accordance with one of TPM standard and TCM standard.

16. The method of claim 12, wherein the location is associated with a government territory, and
wherein the method further comprises connecting the one of the virtual machines based on the government territory associated with the location.

17. The method of claim 16, wherein the geographic territory corresponds to one of a country and governed geographic area.

18. A computing device comprising:
a cryptographic module configured to:
associate first and second cryptographic functions with first and second hardware components, respectively, wherein the first and second hardware components include a Trusted Platform Module (TPM) hardware component and a Trusted Cryptography Module (TCM) hardware component, respectively, and wherein the first and second cryptographic functions operate according to different standards, and wherein the first and second cryptographic functions are associated with different locations;
determine a location of a client;
select, based on the location of the client and the cryptographic function associated with the location, one of cryptographic functions for one of communication with the client and data management;
connect the client to the virtual machine associated with the cryptographic function associated with the location of the client; and
implement, via the virtual machine connected to the client, the selected cryptographic function.

19. The computing device of claim 18, wherein the cryptographic module is configured to one of TPM standard and TCM standard based on the selected cryptographic function.

20. The computing device of claim 18, wherein the cryptographic module is configured to implement communications and data management for a virtual machine used by the client in accordance with the selected cryptographic function.

* * * * *